Figure 1:
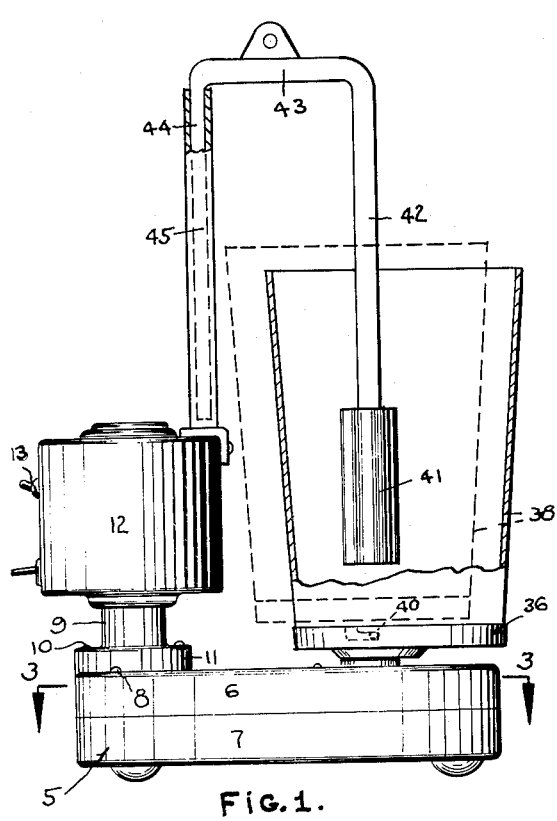

Sept. 28, 1965    H. L. MacDONALD    3,208,733
MIXING DEVICE FOR FOOD AND BEVERAGES
Filed Feb. 3, 1964

INVENTOR.
HORACE L. MacDONALD
BY
ATTORNEY 3,208,733
MIXING DEVICE FOR FOOD AND
BEVERAGES
Horace L. MacDonald, 1312 SE. 11th St.,
Fort Lauderdale, Fla.
Filed Feb. 3, 1964, Ser. No. 341,902
4 Claims. (Cl. 259—72)

This invention relates to a mixing device for food and beverages.

The invention contemplates a base member having an upstanding motor for driving a chain of gearing within the base, a platform for the support of a mixing bowl and an agitator carried by the motor to be shifted downwardly into the bowl and means for rotating and moving the bowl upwardly and downwardly whereby the contents are rotated and engaged with the agitator.

The invention further contemplates a base forming housing having an upstanding drive motor for driving a pinion gear in the housing and with the pinion gear engaging an intermediate gear for rotating a third gear and with the third gear being grooved upon its upper and lower surface to receive ball bearings that are journaled in bearings carried by sections of the housing and whereby the third gear functions to both elevate and lower and to also rotate the ball.

A further object of the invention resides in a mixing device having a rotatable and oscillatory mixing bowl and means to cause the bowl to rotate in an eccentric manner with respect to its driving mechanism.

Novel features of construction and operation of the device will be more clearly apparent during the course of the following description, reference being had to the accompanying drawings wherein has been illustrated a preferred form of the device and wherein like characters of reference are employed to denote like parts throughout the several figures.

Figure 2:
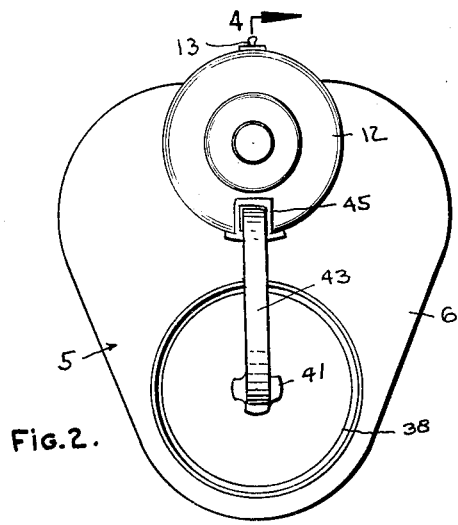
Figure 3:
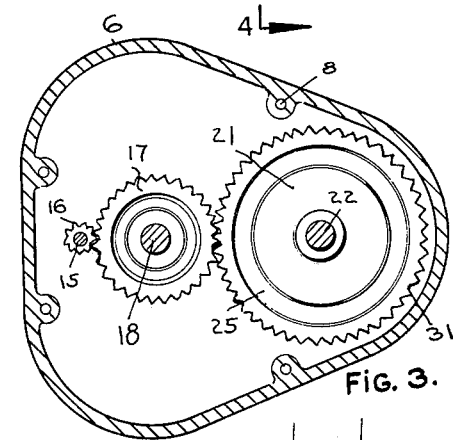
Figure 4:
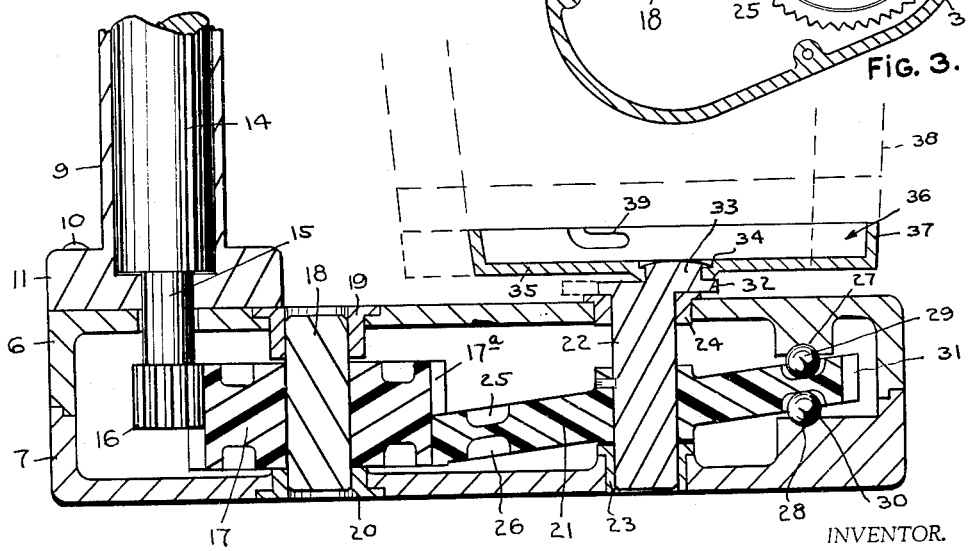

In the drawings:

FIGURE 1 is a side elevation of a mixing device constructed in accordance with the invention, parts being shown in section, FIGURE 2 is a plan view of the device taken at a right angle to that illustrated in FIGURE 1, FIGURE 3 is a horizontal section taken substantially on line 3—3 of FIGURE 1, and FIGURE 4 is an enlarged horizontal section taken substantially on line 4—4 of FIGURE 2.

Referring specifically to the drawings, there has been illustrated a base 5, including upper and lower sections 6 and 7. The base sections 6 and 7 are connected together by screws 8, shown particularly in FIGURE 3.

Mounted upon the top of the section 6 is a tubular housing 9, bolted to the top by means of screws 10, passing through a flange 11 of the housing. At its upper end, the housing 9 supports a drive motor 12, having a suitable switch 13. The drive motor actuates a shaft 14, the lower end of which is reduced at 15, extending into the housing and provided with a drive pinion 16. The drive pinion 16 has meshing engagement with an intermediate relatively thick gear 17, carried upon a stub shaft 18, that is journaled in bushings 19 and 20 and with the bushings 19 and 20 being pressed or otherwise fixedly engaged within openings formed in the housing sections 6 and 7. The gear 17 meshes with a relatively wide gear 21, fixed to a shaft 22, that is journaled in bearings 23 and 24. The gear 21 is angularly arranged with respect to the shaft 22 and its upper and lower faces are circumferentially grooved as shown at 25 and 26. Fixed or rotatable within semi-cylindrical recesses 27 and 28, formed in parts of the upper and lower housing sections 6 and 7 and are adapted to receive ball bearings 29 and 30. The ball bearings 29 and 30 traverse the grooves 25 and 26 as the gear is rotated, causing the gear 21 to move the shaft 22 in an up and down manner and the gear 21 is of such thickness that the teeth 31 thereof will at all times remain in both driving and sliding connection with respect to the teeth 17a of the gear 17.

The shaft 22 extends above the upper surface of the top 6 and carries an eccentric head 32. The eccentric head 32 is provided with an eccentric stud 33 that has riveted engagement within an opening 34, formed in the bottom wall 35 of a pan-like support 36. The support 36 is provided with a circumferential upstanding flange 37 and whereby the support 36 constitutes a receptacle for a mixing bowl 38. The flange 37 at two diametrically opposite points are provided with key slots 39 that receive a lug or key that is formed upon the bottom portion of the bowl 38, shown in dotted lines 40 in FIGURE 1 and that has fitment into the slot 39 in order to lock the bowl into the support 36. Thus far with the bowl 38 locked within the support 36 and with the motor 12 energized, motion is imparted from the pinion 16 through the gear 17 and to the angular gear 21, causing the gear 21 to rotate and in view of its engagement with the balls 28 and 29 rotate the shaft 22 and simultaneously move the shaft in an up and down manner, carrying with it eccentric head 32 and the support 36 with the bowl 38, causing the bowl and its contents to rotate in an eccentric manner and to simultaneously rise and fall under the influence of the movement of the gear 21.

Since it is necessary that an agitator of some type be provided for the bowl 38 and, since the bowl 38 is rotatable, there is no necessity for the agitator to rotate and for this purpose there has been provided an agitator of any desirable configuration, indicated at 41 and the agitator is carried by an upstanding arm 42 that is angled at its upper end as indicated at 43 to form a head for the agitator and the head is then turned downwardly as indicated at 44 and is slidable in a tube 45, that is fixed to the top of the motor 12 or the tube may be mounted directly upon a portion of the base. The agitator 41 is thus supported within the bowl at all times during its operation and may be readily removed when the bowl is to be taken from the support 36 and also for cleansing purposes. The tube 45 and the head extension 44 are preferably formed square in cross section so that the agitator will be held against swinging.

In the use of the device, the bowl 38 is placed upon the support 36 and locked thereto by the lug 40 engaging the slot 39. The agitator is then inserted into the tube 45 and shifted downwardly until the head 43 rests upon the top of the tube 45 and in such position, the agitator is properly spaced with respect to the bowl. Now, the switch 13 is actuated to energize the motor 12, driving the pinion 16, the gear 17 and the gear 21 and, as the gear 21 is rotated its screws 25 and 26 ride between the balls 29 and 30, causing the gear 21 to rise and fall due to its angularity and, since it is fixed to the shaft 22, the shaft will also be elevated and lowered and the eccentric head 32 will cause the support 36 and the bowl 38 to both rise and fall and to also rotate in an eccentric manner and the contents of the bowl are caused to impinge against the agitator 41, creating a mixing and agitating action to the contents of the bowl. The bowl simultaneously rises and falls with respect to the agitator 39 and rotates with the disk 33 at a predetermined speed and in an eccentric manner calculated to thoroughly mix the contents thereof.

It is to be understood that the invention is not limited to the precise construction shown, but that changes are contemplated as readily fall within the spirit of the invention as shall be determined by the scope of the subjoined claims.

I claim:

1. A mixing device for food and beverages that comprises a base housing, an electric motor mounted upon the top of the housing and with the motor driving a shaft that extends into the housing, a pinion gear fixed upon the shaft, an intermediate gear that meshes with the pinion gear and that is fixed upon a stub shaft that is journaled in bearings disposed within the housing, a third gear disposed within the housing and that is in constant mesh with the intermediate gear, the last named gear fixed upon a shaft that is journaled in bearings carried by the housing, means disposed within the housing and that has engagement with the second named gear and that causes the gear to rise and fall with its shaft, the shaft for the second named gear projecting through the top of the housing for connection with a bowl support, a bowl disposed in the support and that is rotatable and movable in an up and down motion under the influence of the second named gear and means causing the support to move with the bowl in an eccentric manner and an agitator adapted to be disposed within the bowl during the rotation and elevation thereof.

2. A mixing device for food and beverages that comprises a base housing, a motor disposed upon the housing and a shaft from the motor that extends through the housing to receive a pinion gear, an intermediate gear that is relatively thick that is in constant mesh with the pinion, a shaft for the intermediate gear that is journaled in bearings carried by the housing, a second gear disposed within the housing and that has constant mesh with the intermediate gear, a shaft for supporting the second gear and with the shaft having journal bearings in the housing and whereby the shaft may rotate, the last named shaft extending above the housing for the support of a bowl support, the second named shaft having an eccentric head portion that is connected to the bowl support centrally thereof and whereby the bowl will be rotatable in an eccentric plane, the second named gear having its upper and lower face concentrically grooved, ball bearings seated within sockets formed within the housing and upon which the second named gear rotates and for causing the second named gear and its shaft to move upwardly and downwardly during its rotation and whereby a bowl supported within the support is rotatable in an eccentric manner while rising and falling under the influence of the shaft, an agitator that is disposed within the bowl, the agitator being non-rotatable and with the agitator being supported within a slide bearing that is carried by the motor and means for locking the bowl into the support during its movement.

3. The structure according to claim 2 wherein the second named gear is angularly arranged from its axial center line and whereby the gear as it engages the ball bearings partakes of an up and down movement.

4. The structure according to claim 2 wherein the housing is formed in two sections, the upper section being provided with a boss that is recessed to receive the upper ball and the lower section of the housing having a boss that is recessed to receive the lower ball bearing and whereby the balls are maintained against shifting during the rotation of the gear, the balls adapted to traverse the grooves of the second named gear.

References Cited by the Examiner

UNITED STATES PATENTS 1,007,930 11/11 Dehuff _____ 259—72
2,543,495 2/51 Henry _____ 259—88

CHARLES A. WILLMUTH, *Primary Examiner.*